(12) United States Patent
Watanabe et al.

(10) Patent No.: US 7,792,190 B2
(45) Date of Patent: Sep. 7, 2010

(54) INSERTING A HIGH RESOLUTION STILL IMAGE INTO A LOWER RESOLUTION VIDEO STREAM

(75) Inventors: Seiichiro Watanabe, Los Gatos, CA (US); Kyojiro Sei, Yokohama (JP)

(73) Assignee: Media Tek Singapore Pte Ltd., Singapore (SG)

( * ) Notice: Subject to any disclaimer, the term of this patent is extended or adjusted under 35 U.S.C. 154(b) by 1321 days.

(21) Appl. No.: 10/938,972

(22) Filed: Sep. 9, 2004

(65) Prior Publication Data

US 2006/0050785 A1 Mar. 9, 2006

(51) Int. Cl.
*H04N 7/12* (2006.01)
*H04N 11/02* (2006.01)
*H04N 11/04* (2006.01)

(52) U.S. Cl. ............... 375/240.03; 375/240.18; 375/240.2

(58) Field of Classification Search ............ 375/240.03, 375/240.18, 240.2
See application file for complete search history.

(56) References Cited

U.S. PATENT DOCUMENTS

| | | | | |
|---|---|---|---|---|
| 5,987,179 A | * | 11/1999 | Riek et al. ............... | 382/236 |
| 5,988,863 A | * | 11/1999 | Demos ..................... | 708/203 |
| 6,192,138 B1 | * | 2/2001 | Yamadaji ................. | 382/100 |
| 6,333,949 B1 | * | 12/2001 | Nakagawa et al. ....... | 375/240.16 |
| 6,510,177 B1 | * | 1/2003 | De Bonet et al. ........ | 375/240.16 |
| 2002/0118750 A1 | * | 8/2002 | Yagasaki et al. ......... | 375/240.11 |
| 2003/0058347 A1 | * | 3/2003 | Lee ........................ | 348/211.4 |
| 2003/0169278 A1 | | 9/2003 | Obrador .................. | 345/629 |

* cited by examiner

*Primary Examiner*—Marsha D Banks Harold
*Assistant Examiner*—Chikaodili E Anyikire
(74) *Attorney, Agent, or Firm*—Joseph S. Spano; Imperium Patent Works

(57) ABSTRACT

A high resolution still image is inserted into a stream of lower resolution video. The lower resolution video stream is a compressed video stream having I-frames. One of the I-frames is a lower resolution version of which a higher resolution image is desired. The I-frame is decoded and decompressed and zoomed up in size to the high resolution size. The zoomed up I-frame is subtracted from the original high resolution still image to generate a difference frame called an X-frame. The X-frame is compressed and inserted into the video stream. The high resolution image can be recovered by extracting the X-frame from the hybrid video stream, and reversing the process used to generate the X-frame. The functionality for regenerating the high resolution image can be realized in software as part of a viewer program, or can be realized as part of a camera, television, or other video display device.

33 Claims, 6 Drawing Sheets

INSERTING A HIGH RESOLUTION STILL IMAGE INTO A LOWER RESOLUTION VIDEO STREAM

TECHNICAL FIELD

The present invention relates to the encoding of a high resolution still image into a lower resolution video stream.

BACKGROUND

Video content such as that seen on a television screen often has a relatively low resolution. Because multiple images are being displayed in rapid succession, the viewer tends not to notice the relatively poor quality of each image. The lower resolution of the video is tolerated so that the amount of information in the video stream can be reduced. In the case where video is communicated across a communication channel having a reduced information carrying capacity, the information flowing through the channel cannot exceed the capacity of the channel. Using lower resolution video that is not perceived by a viewer to be of low quality is therefore an advantage in certain communication situations. Similarly, it may be desired to be able to store the total information content of a sequence of images on a storage medium of limited storage capacity. Being able to use a lower resolution without the viewer noticing the lower resolution in the regenerated video allows the total amount of information stored to be reduced. More video can therefore be stored on the storage medium. Using lower resolution video is therefore an advantage in certain storage situations.

If, however, such a lower resolution video stream is frozen such that a component image is displayed as a still image, then the viewer may recognize the lower resolution of the image. The image may appear to be of noticeably poor quality. This is undesirable.

U.S. Pat. No. 5,987,179 describes a method for encoding a high-fidelity still image in an MPEG bit stream. An original image is selected for encoding as a high-fidelity still image. The original image is encoded as an I-frame. If the I-frame were decompressed and displayed, then the recovered image would not be the same as the original image. Some image information is lost due to the MPEG encoding process. In the method of U.S. Pat. No. 5,987,179, an enhancement frame is added to the bit stream. The enhancement frame includes the encoded difference information between the original image and the previous encoding of the original image. The decoder decodes the I-frame and uses the difference information in the enhancement frame to improve the quality of the regenerated I-frame image. The resulting improved image is of the same resolution as the other uncompressed I-frames of the uncompressed stream and therefore is a rather small still image.

The MPEG2 protocol specifies a "scalability" technique involving multiple layers. The base layer provides the basic spatial resolution. An enhancement layer uses the spatially interpolated layer to increase the basic spatial resolution. While it is possible to transmit a higher resolution video stream using this scalability technique, the entire video stream is increased in resolution. The resolution of a particular image of interest is therefore generally restricted due to overall communication channel bandwidth limitations and. increasing the resolution of all the images of the video stream.

U.S. Pat. No. 5,988,863 describes another method wherein a resolution enhancement layer is generated in addition to an original MPEG2 stream. In one embodiment, the enhancement layer is created by expanding the decoded base layer, taking the difference between the original image and the decoded base layer, and compressing. Like the underlying base MPEG2 stream, the enhancement layer includes I-frames, B-frames and P-frames and employs complex MPEG2-like motion compensated prediction. The resulting pair of streams therefore consumes an undesirably large amount of bandwidth to transmit.

An improved method of embedding a high resolution still image in a lower resolution video stream is therefore desired.

SUMMARY

A high resolution still image is incorporated into a stream of lower resolution video. The lower resolution video stream is a compressed video stream having I-frames. One of the I-frames is a lower resolution version of which a higher resolution image is desired. The I-frame is decoded and decompressed and zoomed up in size to the high resolution size. The zoomed up I-frame is then subtracted from the original high resolution still image to generate a frame of difference information. This frame of difference information is called an X-frame. The X-frame includes a header portion and an image data portion. The header portion identifies the X-frame as an X-frame and contains a picture number, an indication of the size of the X-frame, a picture date, and a picture time. The image data portion is compressed (for example, JPEG-compressed) to reduce the size of the X-frame. The X-frame is then inserted into the lower resolution video stream.

In one embodiment, the resulting video stream resembles an MPEG2 video stream. The video stream is called an "MxPEG" video stream. Like an MPEG2 video stream, the MxPEG video stream has I-frames and P-frames. It also, however, includes X-frames. For each X-frame in the MxPEG stream, there is a corresponding I-frame. There may be, for example, only three X-frames or fewer embedded in the MxPEG video stream per second of video. In one embodiment, fewer than half the I-frames of the MxPEG video stream have associated X-frames. The MxPEG video stream can be communicated from one device to another as an ordinary MPEG2 stream can be. An MxPEG video stream can be stored as a single file as an MPEG2 stream can be. MxPEG encoding functionality can be realized as part of a hybrid digital camera, cell phone, computer, or other device outfitted to record video and capture high resolution still images.

In one embodiment, the high resolution still image is of a resolution higher than the resolution of the display device used to view the video. There are no X-frames for the P-frames and no X-frames for the B-frames in the video stream. There are no X-frames for some I-frames in the video stream in order to decrease the amount of information associated with the MxPEG stream. Only a small number of X-frames per second of video (for example, three per second or less) is included in the MxPEG stream.

The high resolution still image embedded in an MxPEG video stream is regenerated by extracting its corresponding X-frame from the MxPEG video stream, and reversing the encoding process that was used to generate the X-frame from the original high resolution image. MxPEG decoding functionality can be realized as part of a television such as an HDTV television. The MxPEG decoding functionality takes the place of the MPEG2 decoder within such an HDTV television. When a high resolution image is extracted from the MxPEG video stream, the high resolution image can be viewed as a still image on the television screen. The MxPEG decoding functionality can also be built into a cable set-top box, a satellite set-top box, a stereo tuner with video controlling capabilities, an Internet-connected set-top box including a browser such as an MSNTV or WebTV set-top box, an optical disk player (for example, a DVD player), a cell phone, a PDA, or another device that forwards video information on its way to a display device.

MxPEG decoding functionality can also be built into a hybrid digital camera. The hybrid camera can be linked to a television or computer so that video output by the hybrid digital camera can be viewed on the screen of the television or on the computer monitor. A viewer watching the video can freeze the video and thereby cause the hybrid camera to extract one or more embedded high resolution images. File names or thumbnails of the high resolution images are displayed on the television screen or other display device. The viewer uses the file names or thumbnails to select images and to cause high resolution versions of the selected images to be viewed on the television screen or other display device. The viewer can then cause a selected high resolution extracted image to be printed on a printer coupled to the computer or hybrid camera. The viewer can also cause a selected high resolution image to be stored as a discrete file (for example, a JPEG file) on the camera or on a memory card coupled to the camera. Discrete files of extracted high resolution images can be output from the hybrid camera and stored on a digital storage device such as, for example, a personal computer or set-top box in the home. JPEG files of selected high resolution images that are output from the hybrid camera can be communicated over a network or wireless link to another location or storage site.

Not only can MxPEG decoding functionality be realized in hardware as part of a camera or television or other video display device, but MxPEG decoding functionality can also be realized entirely in software. Accordingly, an MxPEG decoder can be part of a viewer program that executes on a personal computer and that decodes MPEG and JPEG. An MxPEG decoder can be integrated into Windows Media Player or Apple QuickTime so that Windows Media Player and Apple QuickTime have MxPEG decoding capabilities.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

The subject matter of Japanese Patent Application Serial Number 2002-363575, filed Dec. 16, 2002, published Jul. 15, 2004 as Japanese Laid-Open Patent Application Number 2004-200760, is hereby incorporated herein by reference.

Figure 1:
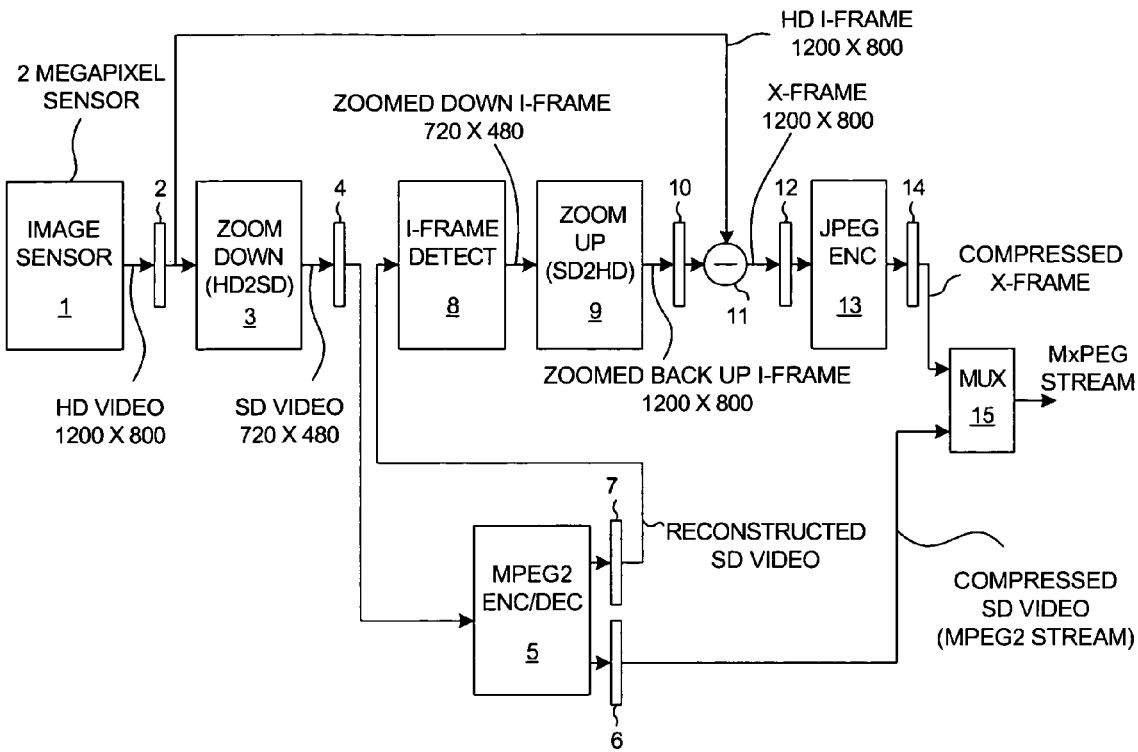
FIG. 1 is a diagram that illustrates a process of generating an MxPEG video stream.

Reference is now made in detail to some embodiments of the invention, examples of which are illustrated in the accompanying drawings. FIG. 1 is a diagram that illustrates in simplified form how an MxPEG video stream is generated in accordance with one embodiment. An image sensor 1 outputs a sequence of frames of high resolution image data. The term high resolution here is a relative term and is used with respect to a lower resolution. Each high resolution image frame in this example is an image frame having 1200×800 pixels. The letters "HD" in this patent document denote high definition or high resolution. The letters "SD" in this patent document denote standard definition or a relatively lower resolution.

Sensor 1 may, for example, be an image sensor of a hybrid digital camera that is capable of both recording a stream of digital video as well as taking high resolution digital still pictures. Preprocessing electronics (not shown) may perform some processing on the raw sensor analog output such that the high resolution image frames are output in digital form. The sequence of high resolution image frames is buffered in a buffer memory 2. Buffer memory 2 may, for example, be a portion of a synchronous dynamic random access memory (SDRAM) that is another part of the digital camera.

A zoom engine 3 reduces the resolution of the high resolution image frames from the high resolution down to the lower resolution. Multiple different circuits and processes are known that can accomplish this function. Zoom engine 3 is, in this example, a type of zoom engine commonly found in digital cameras. In the present example, the resulting lower resolution is 720×480 pixels. The notation "HD2SD" in the zoom engine block denotes a zoom down from high definition "HD" to "2" standard definition "SD". The resulting stream of lower resolution image frames is buffered by buffer memory 4. Buffer memory 4 may, for example, be another part of the SDRAM of the digital camera.

The stream of lower resolution image frames is encoded by MPEG2 encoder 5 into a standard MPEG2 compressed video stream. The MPEG2 video stream is buffered in buffer memory 6. Buffer memory 6 may, for example, be another part of the SDRAM of the digital camera. In accordance with the MPEG2 standard, the MPEG2 video stream includes I-frames (an I-frame is also called an I-picture in this description). In addition to I-frames, the MPEG2 stream includes P-frames and B-frames. In the present example, a decoded I-frame of the MPEG2 video stream is of the lower 720×480 pixel resolution. An I-frame includes all information for a complete 720×480 image and does not depend on other frames before it or after it in the temporal domain to complete the image.

In addition to outputting an MPEG2 video stream, MPEG2 encoder 5 decodes the MPEG2 stream and outputs a reconstructed stream of lower resolution frames. This stream of lower resolution reconstructed frames is buffered in a buffer memory 7. Buffer memory 7 may, for example, be a part of the SDRAM of the digital camera.

One of the reconstructed frames output by MPEG2 encoder 5 is an MPEG2 decoded version of an I-frame in the stream of MPEG2 video output from the MPEG2 encoder 5. The image information in this reconstructed I-frame also originated from a corresponding high resolution image frame output from image sensor 1. This reconstructed frame that corresponds to an I-frame in the MPEG2 stream is detected by an "I-frame detect" functionality 8. The zoom engine increases the number of pixels in the reconstructed I-frame from the lower resolution 720×480 to the higher resolution 1200 by 800. This operation is indicated by zoom up block 9. The "SD2HD" notion in block 9 indicates a zoom up from standard definition "SD" to "2" high definition "HD". The same zoom hardware may perform the zoom down function of block 3 as well as the zoom up function of block 9. The resulting zoomed up reconstructed I-frame is buffered in a buffer memory 10. Buffer memory 10 may, for example, be a portion of the SDRAM of the digital camera.

The original high resolution 1200×800 frame from which the I-frame was originally derived is read out of buffer memory 2 and is supplied to a subtractor functionality 11. The zoomed up reconstructed I-frame is read out of buffer memory 10 and is supplied to the subtractor functionality 11. Subtractor functionality 11 takes the difference between the two high resolution frames thereby generating a 1200×800 frame of difference information. This frame is called an X-frame. To form the X-frame, each pixel value in one of the high resolution frames is subtracted from the corresponding pixel in the other high resolution frame. The resulting 1200× 800 X-frame is buffered in a buffer memory 12. Buffer memory 12 may, for example, be another portion of the SDRAM of the digital camera.

A JPEG encoder 13 performs JPEG encoding and compression on the X-frame and outputs a JPEG-compressed version of the X-frame. The JPEG-compressed version of the X-frame includes a frame header portion and an image data portion. The image data portion is the portion of the X-frame that is JPEG compressed. The frame header portion is not JPEG compressed. The frame header portion contains information that identifies the X-frame as an X-frame and not an I-frame, a P-frame, B-frame, or other type of MPEG2 frame. The X-frame frame header may also contain information indicating the size of the X-frame. The X-frame header may also contain a picture number, a picture date, a picture time, an indication of the photographer, and an indication of the picture topic. The resulting JPEG-compressed X-frame is then buffered in a buffer memory 14. Buffer memory 14 may, for example, be another portion of the SDRAM of the digital camera.

A multiplexing functionality 15 then incorporates the compressed X-frame into the MPEG2 video stream. The X-frame may, for example, be inserted into the MPEG2 stream such that the X-frame is the very next frame after the corresponding I-frame. The resulting video stream is referred to here as an MxPEG video stream. In one embodiment, the functionality of FIG. 1 is realized as part of a hybrid camera that can capture both video as well as high resolution still images. The hybrid camera includes a shutter button. When the hybrid camera is in a video capture mode and is capturing and encoding video, the user can depress the shutter button to cause an X-frame for a high resolution image to be generated and inserted into the MxPEG stream. Alternatively, depressing the shutter button causes a rapid burst of X-frames to be generated and inserted into the MxPEG stream.

The resulting MxPEG stream of video can, for example, be stored on a memory card or mass storage device of the digital camera. The MxPEG stream can be stored on a computer or in any device used to store digital data. The MxPEG stream can be communicated over a wireless communication link or over a hardwired communication link. Video from the MxPEG steam can be viewed on a television screen, the display of a camera or camcorder, the display of a computer, or any other display device usable to display video.

In one example, an MxPEG-enabled HDTV television includes an MPEG2 decoder that decodes an MPEG2 stream that is communicated via an over-the-air broadcast to the television. The format of the incoming MxPEG video stream resembles a standard MPEG2 video stream conventionally received by an HDTV television but for minor differences in the MxPEG stream such as the incorporation of X-frames. The television's MPEG2 decoder decodes the MxPEG video stream and outputs the resulting video as standard 720×480 video.

The MPEG2 decoder of a non-MxPEG-enabled television simply ignores X-frames and decodes the remainder of the MxPEG stream as an ordinary MPEG2 stream of video. Broadcast of MxPEG rather than ordinary MPEG2 does not, therefore, interfere with the operation of non-MxPEG-enabled televisions employing standard MPEG2 decoders.

A viewer who is watching the 720×480 video on a HDTV MxPEG-enabled television may wish to freeze the video at a certain location. To do so, the viewer in one embodiment presses a predetermined button on a remote control device. This key press is communicated from the remote control device to the television. In response, the MPEG2 decoder in the MxPEG-enabled television detects the next X-frame in the MxPEG stream and uses this X-frame to regenerate a high resolution 1200×800 version of the high resolution image from which the X-frame was generated. The high resolution image so regenerated is then displayed on the television screen.

Such a regenerated high resolution image can contain additional information not present in the lower resolution video. The high resolution image can, for example, contain more detailed information about the subject of the video. Where the video is an advertisement, for example, the high resolution image can contain textual information about the product or service being advertised. The high resolution image can be a high resolution image of the product or service advertised. Alternatively, the high resolution image can contain information not related to the subject of the video. The high resolution image can, for example, contain breaking news in textual format that the viewer can see by pressing the predetermined button on the remote control device.

In one embodiment, X-frames with multiple different types of information content are transmitted in the same MxPEG stream where the X-frames carrying a particular type of information are distinguishable from the other X-frames by a code embedded in the header of the X-frame. Particular buttons on a remote control device can be identified with particular types of X-frames such that pressing a first button on the remote control device will cause a first type of information to be displayed on the television screen (for example, breaking news), whereas pressing a second button on the remote control device will cause a second type of information to be displayed on the television screen (for example, more detailed information on the video being viewed). This is but on example. Other ways of having a television viewer select one type of X-frame for viewing are possible.

In one embodiment, the MxPEG-enabled television is internet connected, either directly or via a set-top box, computer, or other device connected to the television. The high resolution image includes hyperlinks usable to access web pages where more information on the product being advertised can be found. The hyperlinks in the high resolution image can be navigated and a selected one activated using the remote control device. A wireless keyboard or other selection device operable with the television can also be used. The identified web page is retrieved from the internet and is displayed on the television screen.

A high quality printer can be linked to the display device so that a high quality print of the image can be made. Where the video is of a personal nature such as a home video, several X-frames may be embedded in each second of MxPEG recorded video. A home viewer who wishes to have a high resolution still shot picture of a particular part of the video can freeze the video at a desired time using the remote control device as described above and can cause the regenerated high resolution image to be printed out on the printer. In this way, an album of high quality high resolution photograph-like prints can be made from a lower resolution home video.

In one embodiment, a series of thumbnail images of different high resolution images in the sequence of captured high resolution images is displayed. The viewer selects one or a few for storage, for communication to another device, or for printing. A high resolution image selected in this manner can, for example, be stored as a JPEG file and can be communicated across a network to a remote location. A selected high resolution image may, for example, be communicated across the internet to a printing service located at a remote location. The remote printing service uses a relatively expensive printer to print the image as a high quality print, and then mails or otherwise forwards the high quality print back to the viewer.

The MPEG2 decoder in the display device uses the X-frame to regenerate the high resolution image by essentially reversing the order of steps by which the X-frame was generated from the original high resolution image. This process is performed as follows. The compressed image data payload portion of the X-frame extracted from the MxPEG stream is JPEG decoded to form a high resolution 1200×800 X-frame. The MPEG2 decoded I-frame that corresponds to the X-frame is identified. This MPEG2 decoded I-frame is zoomed up from the 720×480 low resolution to the high resolution 1200×800 using the zoom engine. The zoomed up high resolution version of the MPEG2 decoded I-frame is then added to the high resolution JPEG decoded X-frame. Each pixel value in the zoomed up high resolution version of the JPEG decoded X-frame is added to the corresponding pixel value in the high resolution version of the MPEG2 decoded I-frame to reverse the subtracting process described above that was used to generate the X-frame. The resulting 1200×800 high resolution frame is a high resolution version of the image of the I-frame.

Figure 2:
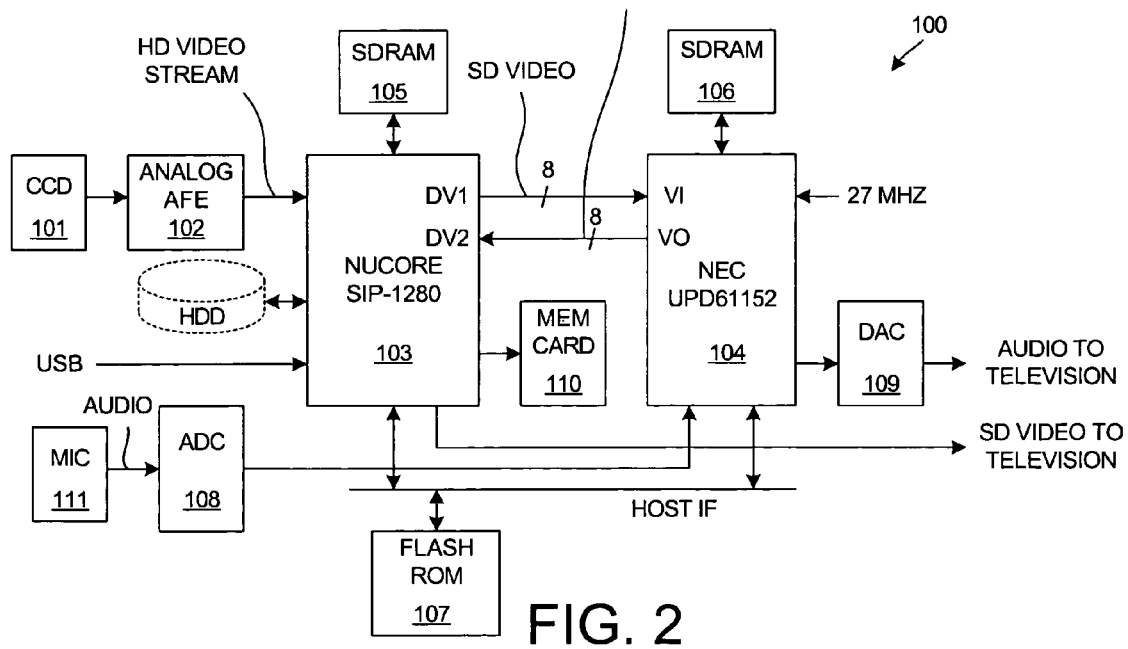
FIG. 2 is a simplified diagram of hardware of a hybrid digital camera capable of generating an MxPEG video stream.

FIG. 2 is a simplified diagram of hardware of a hybrid digital camera 100 in accordance with one embodiment. Hybrid digital camera 100 includes a charge coupled device (CCD) image sensor 101, an analog front end (AFE) integrated circuit 102, a NuCORE SIP-1280 image processing pipeline integrated circuit 103 available from NuCORE Technology Inc. of 1380 Bordeaux Drive, Sunnyvale Calif., a UPD61152 MPEG2 encoder/decoder integrated circuit 104 available from NEC Electronics Inc., a pair of SDRAM integrated circuits 105 and 106, FLASH memory integrated circuit 107, an audio analog-to-digital converter 108, an audio digital-to-analog converter 109, a memory card 110, and a microphone 111.

Figure 3:
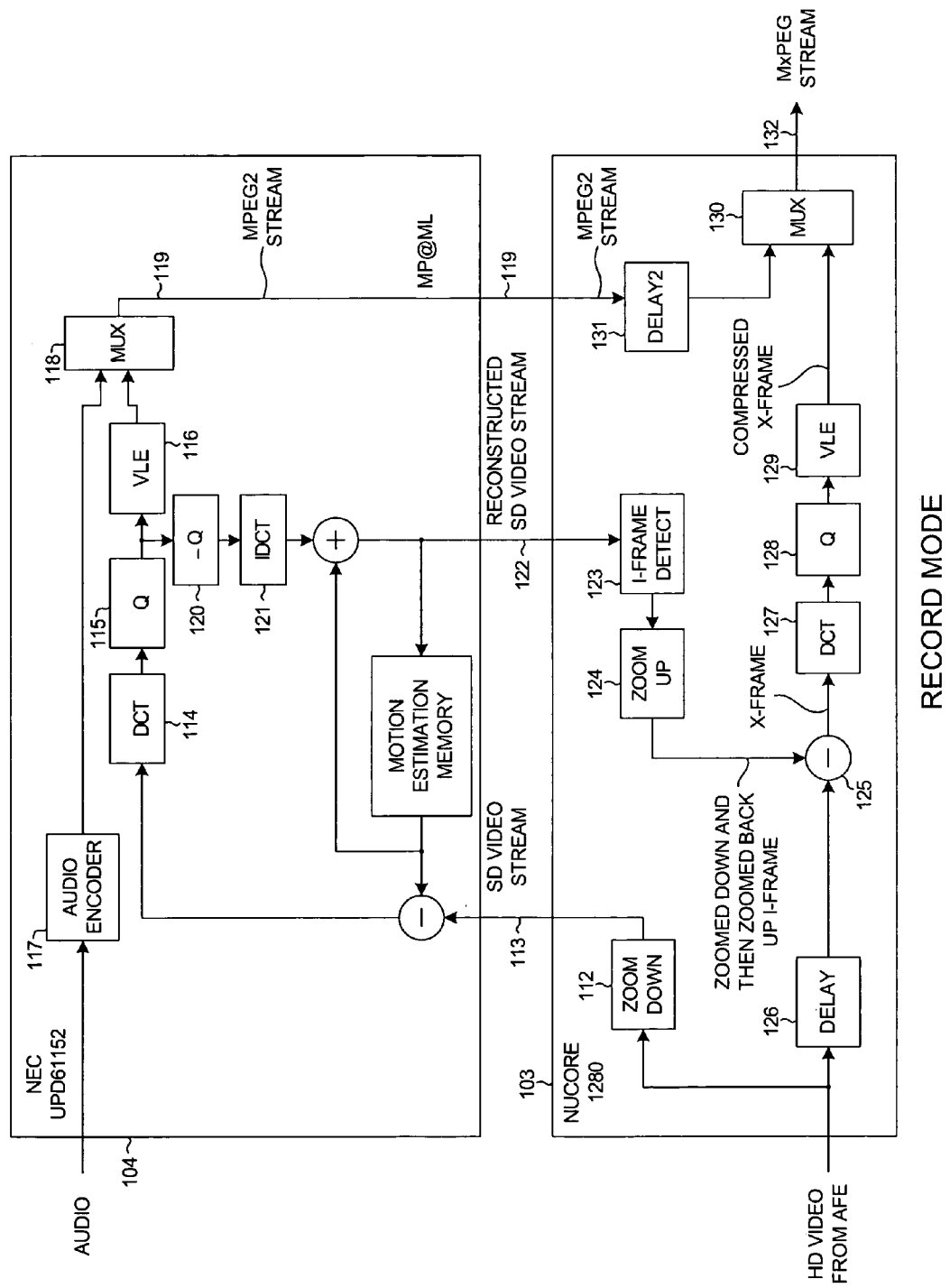
FIG. 3 is a detailed diagram that shows how the integrated circuits 103 and 104 of FIG. 2 function together to generate an MxPEG video stream.

FIG. 3 is a more detailed diagram that shows how functions are performed within the integrated circuits of FIG. 2 in order to form an MxPEG video stream. The high resolution sequence of frames of image information (HD VIDEO) flows into integrated circuit 103 from AFE 102 (see block 102 of FIG. 2). The frames in this sequence are reduced by a zoom engine from high resolution (HD) to low resolution (SD). This operation of the zoom engine is illustrated by zoom down block 112. The resulting SD video stream 113 of 720× 480 resolution is passed from integrated circuit 103 to MPEG2 encoder/decoder integrated circuit 104. MPEG2 encoder/decoder integrated circuit 104 performs discrete cosine transform (DCT) processing 114, quantization (Q) 115, and variable length encoding (VLE) 116 in accordance with the MPEG2 standard. Audio received from analog-to-digital converter 108 (see FIG. 2) is encoded by audio encoder 117 and is merged by multiplexing functionality 118 with the compressed video stream to form an MPEG2 compressed video stream 119.

The output of quantization 115 is also inverse quantized (IQ) 120 and inverse discrete cosine (IDCT) transformed 121. As is known in the art, MPEG2 quantizing results in a loss of image information. Accordingly, the process of DCT transforming, quantizing, inverse quantizing, and inverse DCT transforming an image results in a reconstructed image that is somewhat different than the original image. Because such a reconstructed image is what would be regenerated if an MPEG2 encoded original image were MPEG2 encoded into an I-frame and then MPEG2 decoded, and because such a reconstructed image is what will be used to as a basis to generate the high resolution embedded image, the reconstructed image is supplied to integrated circuit 103 for use in generating the X-frame. The reconstructed SD video stream 122 passes from MPEG2 encoder/decoder integrated circuit 104 and to integrated circuit 103. Reconstructed I-frames are detected as represented by block 123. In some embodiments, I-frames are actually identified by circuitry within the MPEG2 encoder/decoder chip and an indication of the presence of each I-frame is communicated to integrated circuit 103. In other embodiments, circuitry within integrated circuit 103 identifies I-frames, for example by examining the headers of frames.

Regardless of how I-frames are detected, individual reconstructed I-frames are zoomed up from the 720×480 SD low resolution to the 1200×800 HD high resolution by the zoom engine of integrated circuit 103. This zoom up operation is-represented by zoom up block 124. The zoomed up reconstructed I-frames are supplied to a subtractor circuit 125 within integrated circuit 103. The original HD high resolution image frames that gave rise to the I-frames are also supplied to the subtractor circuit 125. The original HD high resolution image frame should be supplied to the subtractor circuit 125 at the same time as the corresponding zoomed up reconstructed I-frame so that subtractor circuit 125 can subtract one from the other. MPEG2 encoder/decoder integrated circuit 104, however, requires an amount of time to do the DCT, quantization, inverse quantization, and IDCT processing required to generate the I-frame and the I-frame detect 123 and zoom up 124 processes also take time to perform. The stream of original HD image frames is therefore delayed in a delay buffer 126 so that an original high resolution image frame will be supplied to the subtractor circuit 125 at the same time that its corresponding zoomed up reconstructed I-frame is supplied to the subtractor circuit 125.

Subtractor circuit 125 subtracts the zoomed up reconstructed I-frame from its corresponding original high resolution image. The resulting high resolution X-frame is then JPEG encoded and compressed by standard JPEG processing blocks DCT block 127, quantization (Q) block 128 and variable length encoding (VLE) block 129. An X-frame header is then added to the compressed image data portion of the X-frame. The resulting JPEG compressed X-frame is then incorporated into the MPEG2 video stream 119 received from MPEG2 encoder/decoder integrated circuit 104 by a multiplexing functionality 130. Because the generation of the JPEG compressed X-frame takes more time in comparison to the generation of corresponding frames in the MPEG2 video stream, a delay memory block 131 is provided so that an X-frame will be inserted into the MPEG2 video stream as the next frame immediately following its corresponding I-frame. The resulting MPEG2 stream with embedded JPEG compressed X-frames is the MxPEG video stream 132 that is output from integrated circuit 103.

Figure 4:
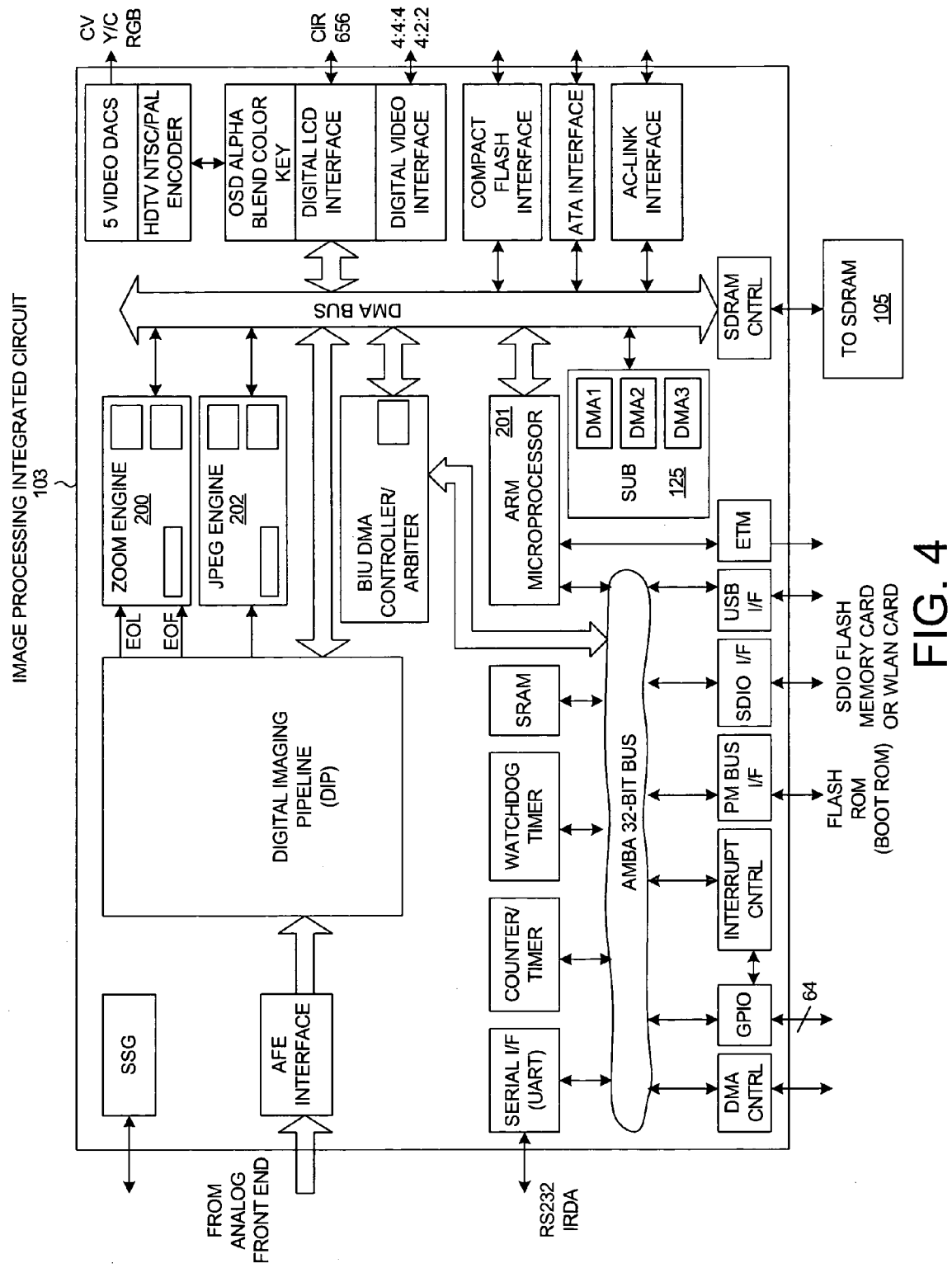
FIG. 4 is a more detailed block diagram of the integrated circuit 103 of FIG. 3.

FIG. 4 is a simplified block diagram of integrated circuit 103. Both the zoom up function and the zoom down function are performed by a zoom engine 200 under control of ARM processor 201. The JPEG compression function is performed by JPEG engine 202 under control of ARM processor 201. ARM processor creates and adds the appropriate X-frame header to the JPEG-compressed image data portion of the X-frame. Subtraction circuit 125 performs the subtraction as explained in connection with FIG. 3. The subtraction circuit 125 is controlled by ARM processor 201. Subtraction circuit 125 has a first DMA engine (DMA1) that is used to read the zoomed up reconstructed I-frame out of SDRAM 105. Subtraction circuit 125 has a second DMA engine (DMA2) that is used to read the delayed original HD full resolution images from delay memory 126. Delay memory 126 may be a portion of SDRAM 105. Subtractor circuit 125 also has a third DMA engine (DMA3) that is used to return the generated X-frame to SDRAM 105. MPEG2 encoding and decoding functionality is provided by the external UPD61152 MPEG2 chip. The external MPEG2 chip receives information from integrated circuit 103 via the block labeled "DIGITAL VIDEO INTERFACE". The external MPEG2 chip supplies information back to integrated circuit 103 via the block labeled "PM BUS I/F".

Figure 5:
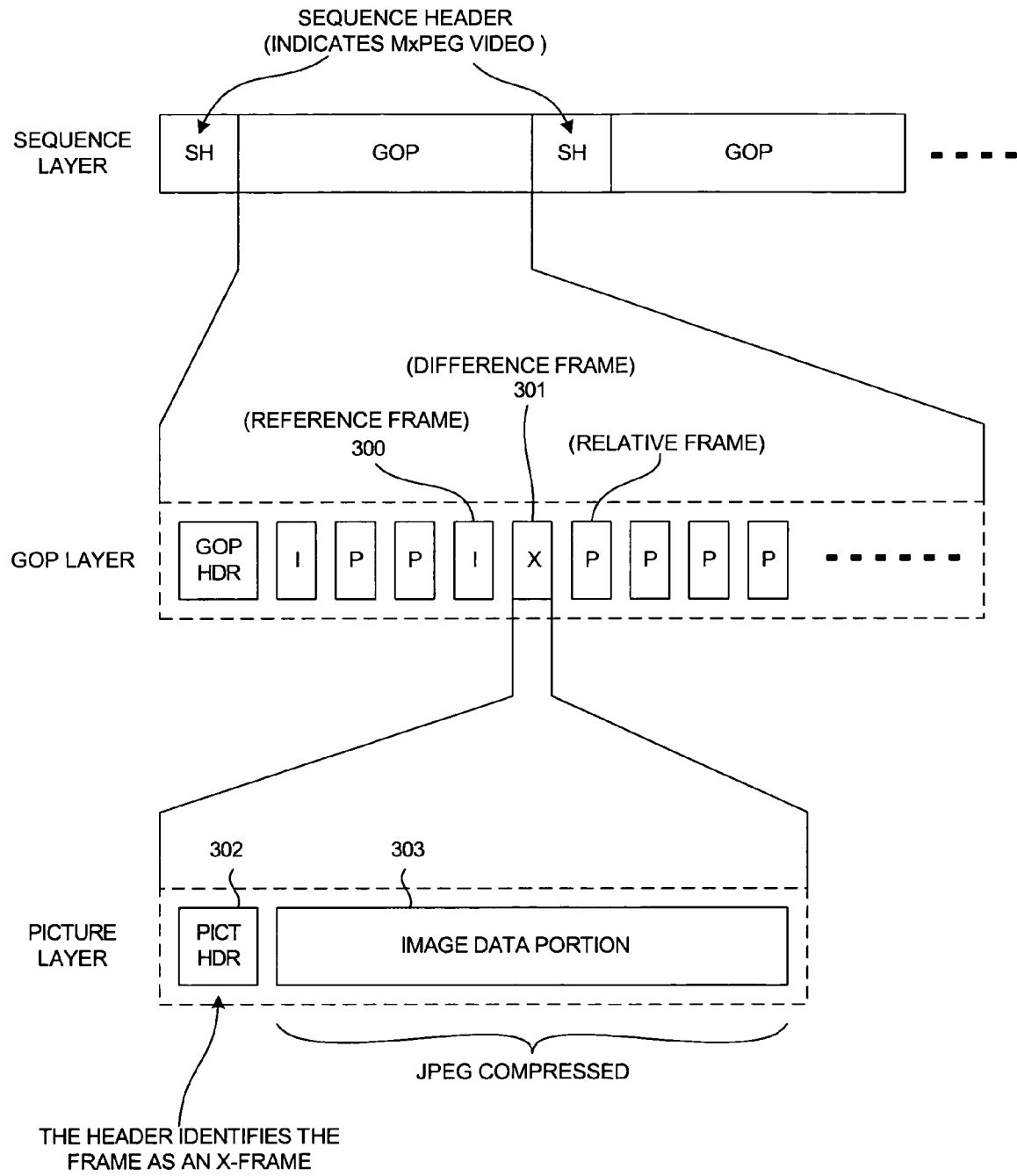
FIG. 5 is a schematic diagram that illustrates one possible way that an X-frame can be incorporated within an MxPEG video stream.

FIG. 5 is a diagram illustrating one possible format of an MxPEG video stream output by the circuitry of FIG. 3. In accordance with the MPEG2 standard, the MxPEG video stream of FIG. 5 includes multiple layers, including a sequence layer, a group of pictures (GOP) layer, and a picture layer. The sequence layer includes sequence layer headers and groups of pictures. A sequence layer header specifies a profile, a level, a picture size, a chroma format, quantizer matrices, and a bit rate. In one embodiment, the sequence header of an MxPEG stream contains information that indicates that the stream is an MxPEG stream and includes X-frames.

The GOP layer includes GOP layer headers and frames of image data. These "frames" are also called "pictures". There may be many different types of frames including I-frames (intra frames), P-frames (predicted frames), B-frames (backward predicted frames) and X-frames. In the illustration of FIG. 5, I-frame 300 is followed by an associated X-frame 301. Image information from X-frame 301 is combined with image information from I-frame 300 in order to generate a high resolution image corresponding to the I-frame in accordance with one aspect of the present invention. The X-frame is incorporated so that the overall bit rate specified in the sequence header is not exceeded. As illustrated, the X-frame includes a header portion 302 and a JPEG-compressed image data portion 303. Header portion 302 identifies the X-frame as an X-frame and distinguishes the X-frame from other types of frames such as I-frames, P-frames and B-frames. Header portion 302 may also contain an indication of the size of the X-frame and a picture number, a picture date, a picture time, an identification of the photographer, and an identification of the picture topic. An MPEG2 decoder may therefore proceed frame by frame through an MxPEG stream performing the MPEG2 decoding function. When a non-MxPEG-enabled MPEG2 decoder detects a frame that is designated as an X-frame, the non-MxPEG-enabled MPEG2 decoder ignores it. MPEG2 decoders that are not MxPEG-enabled therefore can decode the lower resolution video streams of an MxPEG stream and output the lower resolution video in ordinary course without being disrupted by any embedded X-frames. If, however, an MPEG2 decoder is MxPEG-enabled, then it can detect the X-frames and use the information in the X-frames as set forth above to generate a high resolution image.

Figure 6:
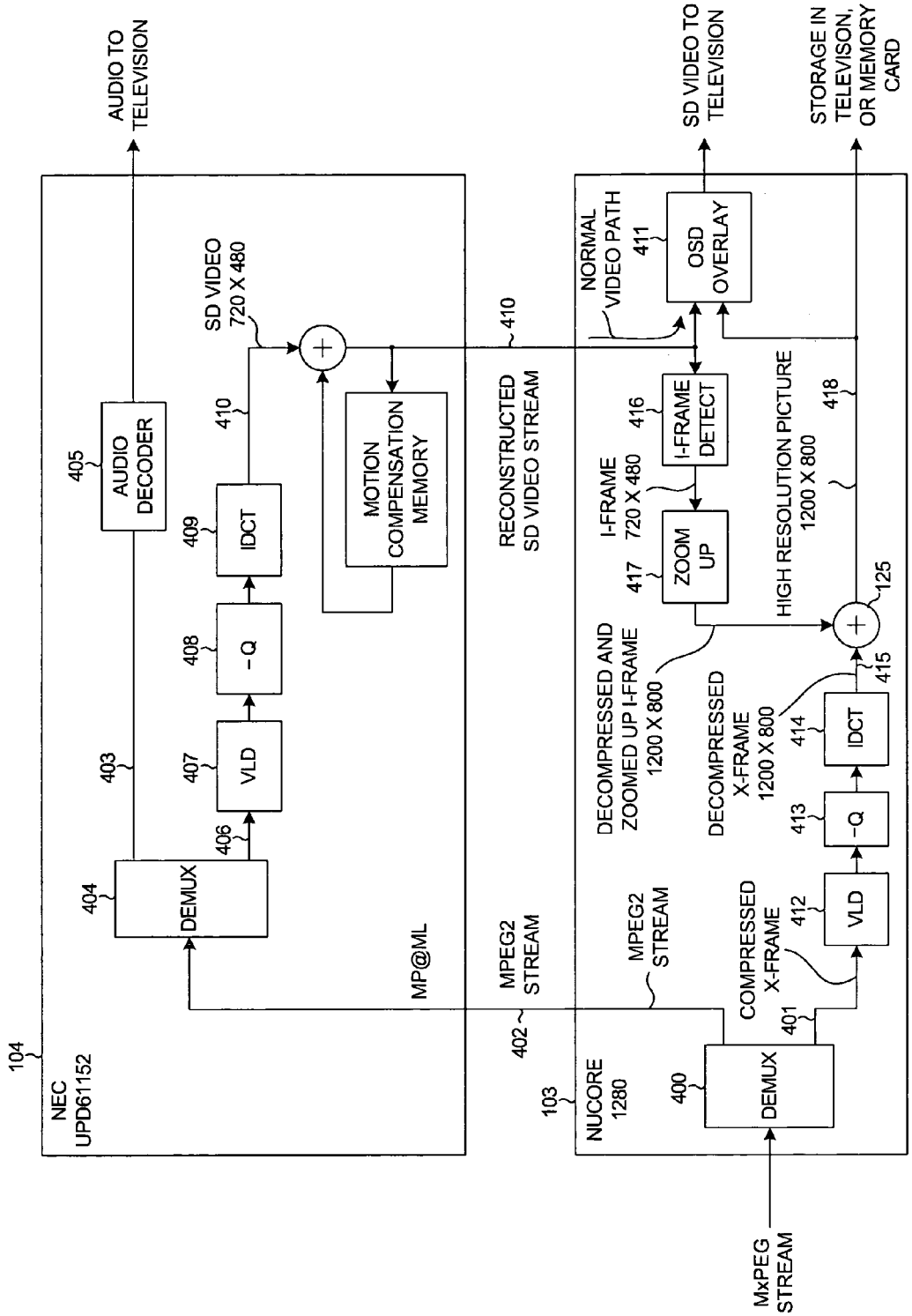
FIG. 6 is a diagram that shows how the integrated circuits 103 and 104 of FIG. 2 function together to extract an X-frame from an MxPEG video stream and to generate a high resolution image.

FIG. 6 is a detailed diagram that shows how functions are performed within integrated-circuits 103 and 104 in order generate a high resolution image from the MxPEG video stream generated by the circuitry of FIG. 3. Integrated circuits 103 and 104 may be part of a digital hybrid camera, the video output of which is communicated to a television or other display device for viewing on the display of the television or other display device. Alternatively, integrated circuits 103 and 104 may be built into an HDTV television so that they take the place of the conventional MPEG2 decoder within the television. The remainder of the television electronics of the HDTV television including the receiver and demodulator can be conventional and is not illustrated in FIG. 6.

As illustrated in FIG. 6, the MxPEG video stream enters integrated circuit 103 at the bottom left of the diagram. A demultiplexing functionality 400 detects and separates the X-frames 401 from the remainder of the MxPEG video stream. The demultiplexing functionality 400 may be implemented by ARM processor 201 (see FIG. 4). The remainder of the MxPEG video stream is an MPEG2 video stream 402. The MPEG2 video stream is transferred to the MPEG2 encoder/decoder integrated circuit 104. The audio portion 403 of MPEG2 stream 402 is separated out by demultiplexing functionality 404, is decoded by audio decoder 405, and is supplied to the television or other display device or system in standard fashion. The video portion 406 of the MPEG2 stream is MPEG2 decoded and decompressed in standard fashion. It is variable length decoded 407, inverse quantized (−Q) 408 and inverse discrete cosine transformed (IDCT) 409. The result is a 720×480 lower resolution (SD) video stream 410 that is supplied back to integrated circuit 103. The video passes through an on-screen display (OSD) functionality 411 and is supplied to the television or other display device for viewing.

The X-frames 401 are JPEG-compressed high resolution 1200×800 frames of image information. The X-frames are JPEG-decoded and decompressed by variable length decode (VLD) block 412, inverse quantizer (−Q) block 413, and inverse discrete cosine transform (IDCT) block 414. Blocks 412, 413 and 414 represent conventional JPEG decoding and decompression. The resulting decompressed 1200×800 X-frames 415 are supplied to subtractor circuit 125.

Decoded and decompressed 720×480 I-frames in the decoded SD video stream 410 are detected as represented by I-frame detect block 416. These I-frames are zoomed up by the zoom engine of integrated circuit 103 as represented by zoom up block 417. The decoded and decompressed 1200× 800 I-frame and its associated 1200×800 X-frame are then added together by circuit 125 to generate a high resolution version of the I-frame image. In contrast to its operation in FIG. 3, subtractor circuit 125 is operating in FIG. 6 in an adder mode. Each pixel value in the X-frame is added by circuit 125 to the value of the corresponding pixel in the associated reconstructed and zoomed-up I-frame to generate a pixel value of the high resolution frame. The three DMA engines described above and illustrated in FIG. 4 are used to retrieve the X-frame values and the reconstructed I-frame values from SDRAM, and to write the resulting high resolution image values back out to SDRAM.

The high resolution image frames 418 are supplied to the OSD overlay circuitry 411 so that they can be displayed on the television screen or other display device. The high resolution image frames 418 may also be output from integrated circuit 103 for storage or printing or communication. In the illustrated example, the high resolution image frames 418 are stored in memory within the television. Storage within the television may, for example, be on a memory card or hard disk. Storage for such high resolution images may be provided within a set-top box linked to the television. Storage for such high resolution images may be provided in a storage area network within the home and/or at remote sites. In examples where integrated circuits 103 and 104 are embodied within a hybrid digital camera, the high resolution image frames 418 can be output and stored on a memory card of the hybrid digital camera in substantially the same fashion that other high resolution still pictures taken by the hybrid digital camera are stored. The file name of each high resolution still picture includes a file size, a picture number, a picture date, a picture time, an indication of the photographer, and an indication of picture topic. The camera is linked to the television by a cable or other means so that the camera can perform its MxPEG camcorder playback function and supply the resulting video stream to the television for viewing.

Figure 7:
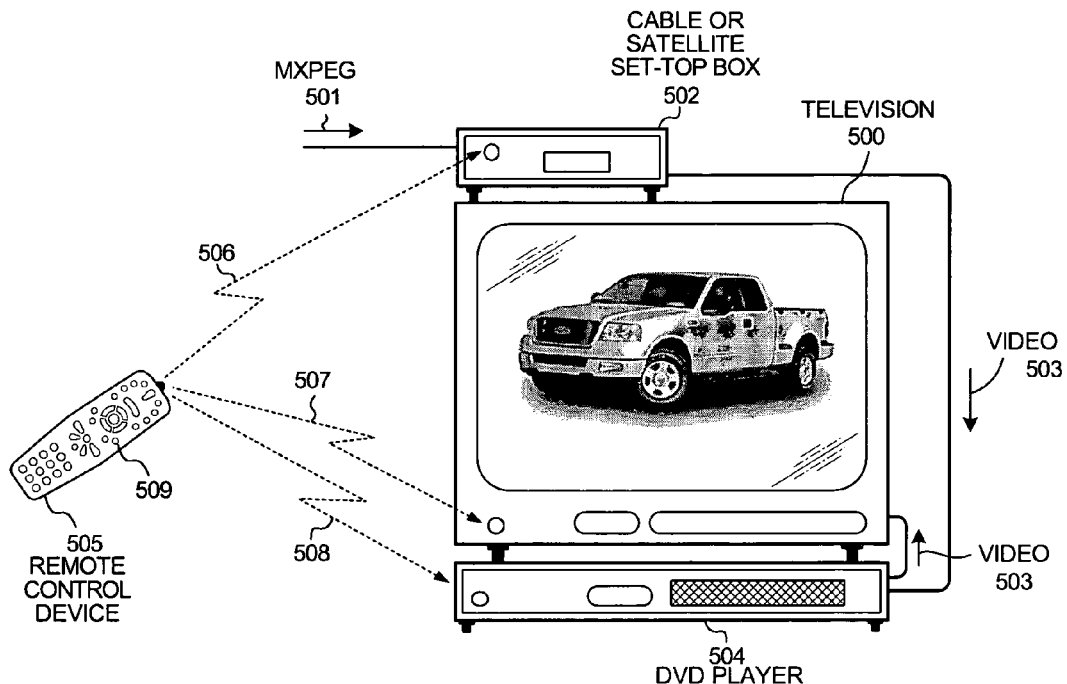
FIG. 7 is a diagram of video from an MxPEG video stream being displayed on a television screen.
Figure 8:
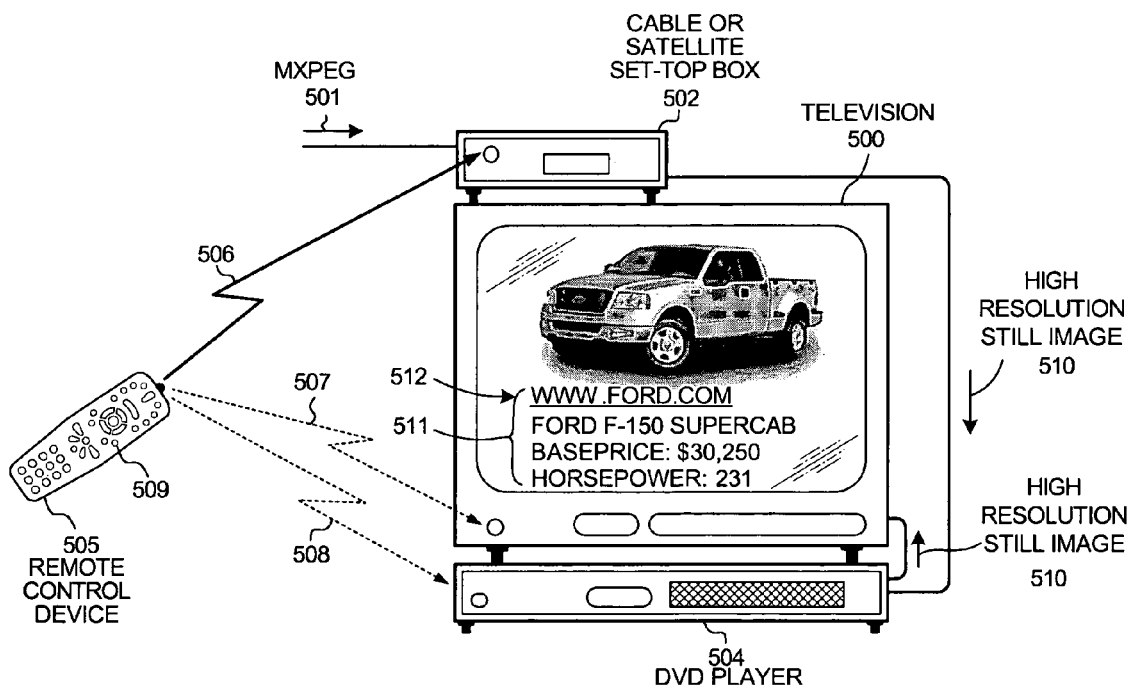
FIG. 8 is a diagram that shows how a high resolution still image is displayed on the television screen of FIG. 7 in response to the pressing of a predetermined button on a remote control device. The high resolution still image includes additional information related to the video. In the case where the video is an advertisement for a product or service, the high resolution still image includes additional information on the advertised product or service.

FIGS. 7 and 8 illustrate a method involving a television 500. An MxPEG video stream 501 is received onto a set-top box 502 which decodes the MxPEG video stream and outputs video 503. This video 503 passes through DVD player 504 and is ultimately displayed on the screen of television 500. A remote control device 505 can communicate and control devices 500, 502 and 504 by sending appropriate communications 506, 507 and 508 to the respective devices, 500, 502 and 504. Rather than displaying video derived from the MxPEG stream received by the set-top box 502, television screen can also be made to display video derived from an MxPEG stream encoded on an optical disk. In such an example, DVD player 504 decodes the MxPEG information on an optical disk and outputs the resulting video to television 500 which in turn displays the video. In the example of FIG. 7, an MxPEG video stream received onto set-top box 502 is decoded by set-top box 502 and the resulting video is displayed on television 500. The video is an advertisement for a truck. If the viewer is interested in the topic of the video and wants to see more information, then the user presses a button 509 on remote control device 505. This causes remote control device 505 to send a control signal 506 to set-top box 502 which causes set-top box 502 to use the next X-frame embedded in the MxPEG video 501 to generate a high resolution still image as described above. This is illustrated in FIG. 8. The high resolution still image 510 includes additional information 511 on the topic of the video at the time when the user pressed button 509. In this example, the high resolution still image includes more detailed information on the truck being advertised. The high resolution still image can be displayed either by itself (as repetitive displays of the same still image, for example) on the television screen, or can be overlaid such that the still image appears as an overlay over moving video. The more detailed information 511 can include a hyperlink 512 that is selectable by the viewer. If the viewer selects the hyperlink, a browser within set-top box 502 is made to retrieve the web page indicated by the hyperlink from the world wide web in the manner of an MSNTV or WebTV set-top box and to supply the retrieved web page to television 500 for display. A television broadcaster can charge an advertiser a fee based on the number of times viewers access the web page.

MxPEG video 501 can be broadcast as an HDTV signal that does not disrupt the ordinary baseline MPEG2 decoder within the HDTV television. At any point in the television programming being viewed, the viewer can press a button on a remote control device and cause the display of additional detailed information relevant to the segment of video being viewed. The viewing of the additional detailed information may be provided only to viewers who pay an additional charge, in which the MxPEG decoder of the viewer is enabled to regenerate and display the additional detailed information. In the same way that set-top box 502 is made to generate a high resolution image from an X-frame by the pressing of button 509 on remote control device 505, so too can other devices that have an MxPEG decoding mechanism (for example, an MxPEG-enabled television or an MxPEG-enabled DVD player) be made to generate a high resolution image from an X-frame by the pressing of a button on a remote control device.

In one embodiment, the MxPEG decoding process set forth above is realized in software as part of a viewer program typically used to decompress still images and video. The MxPEG decoding process can be incorporated as part of Windows Media Player or Apple QuickTime Player.

In one embodiment, an MxPEG stream is generated by a first device at a first location and is then transmitted to a second device at a second location. The transmission may occur over a hardwired connection or via a wireless link. The transmission may occur over a network. The second device decodes and decompresses the MxPEG stream and displays it as video for viewing by a viewer. A viewer who is watching the video at the second location can cause a signal to be sent back to the first device at the first location such that the first device captures a high resolution image and inserts an X-frame for that high resolution image into the MxPEG stream. The X-frame is then communicated in the MxPEG stream from the first device to the second device where it is used to regenerate the original high resolution image at the second location.

Although the present invention has been described in connection with certain specific embodiments for instructional purposes, the present invention is not limited thereto. MxPEG encoding functionality can be practiced as a novel method or as a novel apparatus. MxPEG decoding functionality can be practiced as a novel method or as a novel apparatus. Although an MxPEG encoding functionality is set forth above involving a zoom down step and a zoom up step, these zoom steps are not necessary in all situations. For example, where an MPEG2 encoder/decoder can receive the higher resolution stream as an input and where the MPEG2 encoder/decoder can output the reconstructed video stream at the higher resolution, no zoom down and zoom up steps are required. Integrated circuit 103 need not perform any zoom functionalities in the MxPEG encoding process. Similarly, no zoom up step is required in the MxPEG decoding process where the MPEG2 decoder outputs decoded video at the higher resolution of the original high resolution image. Integrated circuit 103 need not perform any zoom up functionality. Although the incorporation of a frame of difference information into a video stream is described above in connection with incorporation into an MPEG2 video stream, the technique is not limited to any particular video encoding/decoding or compression/decompression scheme. In particular, frames of difference information can be incorporated into video streams other than MPEG2 video streams, such as for example, motion-JPEG streams, MPEG4 streams and MPEG1 streams. Compression techniques other than those utilizing the discrete cosine transform can be employed. MxPEG encoders and decoders can be realized in hardware, software, or a combination of the two. An MxPEG encoder or decoder can be realized on a programmable device such as, for example, a field programmable gate array (FPGA). The reference frame used to make an X-frame need not be an I-frame but can, for example, be a high resolution still image frame that is incorporated into a lower resolution video stream. The X-frame may be-generated relative to this high resolution still image frame. Accordingly, various modifications, adaptations, and combinations of various features of the described embodiments can be practiced without departing from the scope of the invention as set forth in the claims.

What is claimed is:

1. A method comprising:
   (a) transforming a sequence of frames of image data into a video stream, wherein one of the frames of image data is a selected frame of a first pixel resolution, and wherein the video stream is of a second pixel resolution, the video stream including a sequence of I-frames, wherein the first pixel resolution is greater than the second pixel resolution, and wherein a reduced resolution version frame of said selected frame is present in the video stream in the form of one of the I-frames;
   (b) transforming said selected frame from a first domain to a second domain to obtain a second frame of image data;
   (c) quantizing the second frame of image data to obtain a third frame of image data;
   (d) inverse quantizing the third frame of image data to obtain a fourth frame of image data;
   (e) inverse transforming the fourth frame of image data from the second domain to the first domain and thereby obtaining a fifth frame of image data;
   (f) zooming up the fifth frame of image data to the first pixel resolution to obtain a sixth frame of image data;
   (g) differencing said selected frame and the sixth frame and thereby generating a frame of difference information, the frame of difference information being associated in one-to-one correspondence with said one of the I-frames;
   (h) incorporating the frame of difference information into the video stream; and
   (i) repeating steps (b) through (h) such that some of the I-frames have associated frames of difference information and such that others of the I-frames do not have associated frames of difference information.

2. The method of claim 1, wherein step (a) involves MPEG2 encoding said selected frame to form said one of the I-frames, and wherein steps (b) and (c) are steps in said MPEG2 encoding of said selected frame to form said one of the I-frames.

3. The method of claim 1, wherein the sequence of I-frames includes a first I-frame that has an associated frame of difference information that is incorporated into the video stream in step (h), wherein the sequence of I-frames includes a second I-frame that has no associated frame of difference information that is incorporated into the video stream in step (h), wherein the sequence of I-frames includes a third I-frame that has an associated frame of difference information that is incorporated into the video stream in step (h), and wherein the first, second and third I-frames occur in the video stream in the order first, second, third.

4. The method of claim 1, wherein the frame of difference information incorporated into the video stream in (h) is compressed difference information.

5. The method of claim 1, wherein the video stream is an MPEG2 video stream having I-frames and P-frames and B-frames, and wherein none of the P-frames and none of the B-frames has an associated frame of difference information in the video stream.

6. The method of claim 1, wherein the video stream is a compressed video stream.

7. The method of claim 1, wherein the reduced resolution version frame is an I-frame.

8. The method of claim 1, wherein the frame of difference information includes a picture header portion and an image data portion, and wherein the frame of difference information includes no motion vectors.

9. The method of claim 1, wherein the selected frame is zoomed down to the second pixel resolution prior to the transforming of step (b).

10. The method of claim 1, wherein the transforming of step (b) is a discrete cosine transforming (DCT), and wherein the inverse transforming of step (e) is an inverse discrete cosine transforming (IDCT).

11. The method of claim 1, wherein steps (a) through (i) are performed by a digital camera, wherein the frame of difference information incorporated into the video stream is a compressed frame, wherein the compressed frame is generated by a compression engine of the digital camera, wherein said compression engine also compresses other image frames, the other image frames being stored in the digital camera as discrete files.

12. A method for generating a final video stream of a first pixel resolution, the final video stream including a sequence of I-frames, the final video stream including a difference frame, the difference frame being a compressed frame of a second pixel resolution, the second pixel resolution being greater than the first pixel resolution, wherein the difference frame and one of the I-frames both correspond to an original image frame, the method comprising:
   (a) zooming down the original image frame and thereby generating a first frame of image information;
   (b) transforming and compressing the first frame of image information and thereby generating a second frame of image information;
   (c) decompressing and inverse transforming the second frame of image information and thereby generating a third frame of image information;
   (d) zooming up the third frame of image information and thereby generating a fourth frame of image information, the fourth frame of image information being of the second pixel resolution;
   (e) differencing the fourth frame of image information and the original image frame and thereby generating a fifth frame of image information;
   (f) transforming and compressing the fifth frame of image information and thereby generating the difference frame;
   (g) incorporating the difference frame into a video stream;
   (h) repeating steps (a) through (g) and thereby generating the final video stream such that the final video stream comprises multiple difference frames, wherein the final video stream includes a first difference frame associated with a first I-frame of the final video stream, wherein there is no difference frame associated with a second I-frame of the final video stream, wherein there is a second difference frame associated with a third I-frame of the final video stream, and wherein the first, second and third I-frames occur in the final video stream in the order first, second and third.

13. The method of claim 12, further comprising:
pressing a button on a camera, wherein the pressing of the button causes a rapid sequence of difference frames to be generated and incorporated into the video stream thereby generating the final video stream.

14. A method comprising:
(a) receiving a video stream, wherein the video stream includes a stream of image frames of a first pixel resolution and also includes a compressed difference image frame;
(b) decompressing the compressed difference image frame to generate a first frame of a second pixel resolution, wherein the second pixel resolution is greater than the first pixel resolution;
(c) decompressing an image frame of the stream of image frames of the first pixel resolution and thereby generating a decompressed image frame of the first pixel resolution;
(d) zooming up the decompressed image frame of the first pixel resolution to generate a second frame of the second pixel resolution; and
(e) adding the first frame of the second pixel resolution to the second frame of the second pixel resolution and thereby generating a third image frame of the second pixel resolution.

15. The method of claim 14, wherein the video stream is an MPEG2 video stream comprising compressed I-frames and compressed P-frames, and wherein the decompressed image frame of the first pixel resolution is a decompressed I-frame of the MPEG2 video stream.

16. The method of claim 14, wherein the decompressing of (b) is JPEG decompression.

17. The method of claim 14, wherein the decompressing of step (b) includes a variable length decoding step, an inverse quantizing step, and an inverse discrete cosine transforming (IDCT) step.

18. The method of claim 14, wherein the video stream is a compressed video stream, wherein the compressed video stream is decompressed and then output to a display device, the method further comprising:
outputting the third image frame to the display device.

19. The method of claim 18, further comprising:
receiving a prompt from a user of a display device such that the display device switches from displaying video of the decompressed video stream and switches to displaying the third image frame.

20. The method of claim 14, wherein the compressed difference image frame includes a picture header portion and an image data portion.

21. The method of claim 14, wherein steps (a) through (e) are performed by one of the group consisting of: a television, a personal computer, a cable set-top box, a satellite set-top box, an optical disk player, a video recorder, a hybrid digital camera, and a stereo tuner/receiver with video controlling capabilities.

22. The method of claim 14, wherein the third image frame contains advertising information.

23. The method of claim 14, wherein steps (a) through (e) are performed by a software video viewer program executing on a personal computer.

24. An encoding apparatus, comprising:
a video encoder that outputs a compressed video stream of a first pixel resolution, the compressed video stream including a sequence of reference frames, and relative frames; and
circuitry that receives a high pixel resolution image frame that corresponds to one of the reference frames, the high pixel resolution image frame being of a second pixel resolution, the second pixel resolution being substantially greater than the first pixel resolution, the circuitry generating an X-frame that represents a difference between the high pixel resolution image frame and the said one reference frame, wherein said one reference frame is an I-frame, X-frame is not a reference frame, or a relative frame; and
multiplexing circuitry that inserts the X-frame into the compressed video stream.

25. The apparatus of claim 24, wherein the compressed video stream as it is output from the multiplexing circuitry includes a substantially greater number of reference frames than X-frames.

26. The apparatus of claim 25, wherein the multiplexing circuitry inserts fewer than three X-frames per second into the compressed video stream such that the compressed video stream as it is output from the multiplexing circuitry includes fewer than three X-frames per second of video.

27. A decoding apparatus comprising:
a video decoder that receives a compressed video stream of a first pixel resolution, the compressed video stream including a sequence of I-frames and P-frames, the video decoder outputting a decompressed video stream of the first pixel resolution; and
circuitry that decompresses an X-frame to generate a decompressed X-frame, the decompressed X-frame representing a difference between a high pixel resolution image frame and information in one of the I-frames of the compressed video stream, the high pixel resolution image frame being of a second pixel resolution, the second pixel resolution being substantially greater than the first pixel resolution, the circuitry combining the decompressed X-frame and information in said one I-frame to regenerate the high pixel resolution image frame.

28. The decoding apparatus of claim 27, wherein the X-frame is received onto the decoding apparatus as part of the compressed video stream, the compressed video stream including a substantially greater number of I-frames than X-frames.

29. The decoding apparatus of claim 28, wherein the X-frame includes a header that indicates that the X-frame is not an I-frame and is not a P-frame.

30. The decoding apparatus of claim 29, wherein there are fewer than three X-frames embedded in each second of the compressed video stream.

31. A digital camera comprising:
a video encoder that outputs a compressed video stream of a first pixel resolution, the compressed video stream including a sequence of I-frames and P-frames; and
means for receiving a high pixel resolution image frame that corresponds to one of the I-frames, the high pixel resolution image frame being of a second pixel resolution, the second pixel resolution being substantially greater than the first pixel resolution, the means generating an X-frame that represents difference information between the high pixel resolution image frame and an uncompressed and zoomed-up version of the I-frame, wherein the means inserts the X-frame into the compressed video stream, the means inserting substantially fewer X-frames into the compressed video stream than there are I-frames in the compressed video stream.

32. The digital camera of claim 31, wherein the uncompressed and zoomed-up version of the I-frame is of the second pixel resolution.

33. The digital camera of claim 31, wherein each of the I-frames and each of the X-frames is compressed in accordance with a single compression method, and wherein there are fewer than three X-frames embedded in each second of the compressed video stream.

* * * * *